(12) United States Patent
Caine et al.

(10) Patent No.: US 12,699,894 B2
(45) Date of Patent: Aug. 4, 2026

(54) THREE-DIMENSIONAL OBJECT DETECTION USING PSEUDO-LABELS

(71) Applicant: Google LLC, Mountain View, CA (US)

(72) Inventors: Benjamin James Caine, San Francisco, CA (US); Rebecca Dawn Roelofs, Oakland, CA (US); Jonathon Shlens, San Francisco, CA (US); Zhifeng Chen, Sunnyvale, CA (US); Jiquan Ngiam, Mountain View, CA (US); Vijay Vasudevan, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 1151 days.

(21) Appl. No.: 17/547,143

(22) Filed: Dec. 9, 2021

(65) Prior Publication Data

US 2022/0180193 A1 Jun. 9, 2022

Related U.S. Application Data

(60) Provisional application No. 63/123,407, filed on Dec. 9, 2020.

(51) Int. Cl.
*G06F 18/214* (2023.01)
*G06N 3/08* (2023.01)

(52) U.S. Cl.
CPC .................................... *G06N 3/08* (2013.01)

(58) Field of Classification Search
CPC ........ G06N 3/08; G06N 3/045; G02B 21/008; G05B 2219/40532; G06T 2200/04; G06T 2200/08; G05D 1/2435; G05D 1/2465; G01N 2203/0647; G01N 2223/401
See application file for complete search history.

(56) References Cited

U.S. PATENT DOCUMENTS 11,587,291 B2 * 2/2023 Wang ........................ G06T 3/40
2022/0161815 A1 * 5/2022 Van Beek ............. B60W 40/09

FOREIGN PATENT DOCUMENTS

EP 3748545 A1 * 12/2020 ............. G06N 3/045

OTHER PUBLICATIONS

Cai, Qi, et al. "Exploring object relation in mean teacher for cross-domain detection." Proceedings of the IEEE/CVF conference on computer vision and pattern recognition. 2019. (Year: 2019).*
Gustafsson, Niklas, and Gustav RÃ¶dstrÃ¶m. "Semi-supervised learning for autonomous vehicle object detection." (2020). (Year: 2020).*
Hu, Jingliang, Lichao Mou, and Xiao Xiang Zhu. "Unsupervised domain adaptation using a teacher-student network for cross-city classification of sentinel-2 images." The International Archives of the Photogrammetry, Remote Sensing and Spatial Information Sciences 43 (2020): 1569-1574. (Year: 2020).*

(Continued)

*Primary Examiner* — Cesar B Paula
(74) *Attorney, Agent, or Firm* — Fish & Richardson P.C.

(57) ABSTRACT

Methods, systems, and apparatus, including computer programs encoded on computer storage media, for training a neural network to perform 3D object detection. One of the methods includes training a student neural network to perform 3D object detection using pseudo-labels generated by a teacher neural network.

20 Claims, 3 Drawing Sheets

(56) References Cited

OTHER PUBLICATIONS

Yang, Yiding, et al. "Distilling knowledge from graph convolutional networks." Proceedings of the IEEE/CVF conference on computer vision and pattern recognition. 2020. (Year: 2020).*

Yin, Huan, et al. "3d lidar map compression for efficient localization on resource constrained vehicles." IEEE transactions on intelligent transportation systems 22.2 (2020): 837-852. (Year: 2020).*

Qin, Zengyi, Jinglu Wang, and Yan Lu. "Weakly supervised 3d object detection from point clouds." Proceedings of the 28th ACM International Conference on Multimedia. 2020. (Year: 2020).*

Zhang, Rui, et al. "Remote sensing image scene classification with noisy label distillation." Remote Sensing 12.15 (2020): 2376. (Year: 2020).*

Zhao, Na, Tat-Seng Chua, and Gim Hee Lee. "Sess: Self-ensembling semi-supervised 3d object detection." Proceedings of the IEEE/CVF Conference on Computer Vision and Pattern Recognition. 2020. (Year: 2020).*

Bendrycks et al., "Benchmarking Neural Network Robustness to Common Corruptions and Perturbations," arXiv, Mar. 28, 2019, 16 pages.

Berthelot et al., "MixMatch: A holistic approach to semi-supervised learning," Advances in Neural Information Processing, 2019, 11 pages.

Berthelot et al., "ReMixMatch: Semi-Supervised Learning with Distribution Alignment and Augmentation Anchoring," arXiv, Nov. 21, 2019, 13 pages.

Bewley et al., "Range conditioned dilated convolutions for scale invariant 3D object detection," arXiv, Jun. 30, 2020, 22 pages.

Biggio et al., "Wild patterns: Ten years after the rise of adversial machine learning," Pattern Recognition, Dec. 2018, 49 pages.

Bousmalis et al., "Unsupervised Pixel-Level Domain Adaptation With Generative Adversarial Networks," Proceedings of the IEEE Conference on Computer Vision and Pattern Recognition (CVPR), Jul. 2017, pp. 3722-3731.

Caesar et al., "nuScenes: A Multimodal Dataset for Autonomous Driving," Proceedings of the IEEE/CVF Conference on Computer Vision and Pattern Recognition (CVPR), Jun. 2020, pp. 11621-11631.

Chen et al., "Naïve-Student: Leveraging Semi-Supervised Learning in Video Sequences for Urban Scene Segmentation," Presented at 16th European Conference on Computer Vision, online, Aug. 23-28, 2020, 19 pages.

Chen et al., "Semi-Supervised Learning in Video Sequences for Urban Scene Segmentation," arXiv, May 20, 2020, 21 pages.

Cheng et al., "Improving 3D object detection through progressive population based augmentation," arXiv, Jul. 16, 2020, 21 pages.

Ding et al., "1st Place Solution for Waymo Open Dataset Challenge—3D Detection and Domain Adaptation," arXiv, Jun. 28, 2020, 8 pages.

Ganin et al., "Domain-adversarial training of neural networks," Journal of Machine Learning Research, Apr. 2016, 35 pages.

Ge et al., "AFDet: Anchor Free One Stage 3D Object Detection," arXiv, Jun. 30, 2020, 10 pages.

Geiger et al., "Vision meets robotics: The KITTI dataset," The International Journal of Robotics Research, Aug. 23, 2013, 32(11):1231-1237.

Han et al., "Streaming Object Detection for 3-D Point Clouds," European Conference on Computer Vision, Dec. 4, 2020, 20 pages.

He et al., "Structure Aware Single-Stage 3D Object Detection From Point Cloud," Proceedings of the IEEE/CVF Conference on Computer Vision and Pattern Recognition, Jun. 2020, pp. 11873-11882.

Houston et al., "One Thousand and One Hours: Self-driving Motion Prediction Dataset," arXiv, Nov. 16, 2020, 10 pages.

Kahn et al., "Self-training for end-to-end speech recognition," Presented at 45th International Conference on Acoustics, Speech, and Signal Processing, Virtual Barcelona, Spain, May 4-8, 2020, pp. 7084-7088.

Kingma et al., "Adam: A Method for Stochastic Optimization," arXiv, Dec. 22, 2014, 9 pages.

Krizhevsky et al., "Convolulional deep belief networks on CIFAR-10," Unpublished manuscript, 2010, 40(7): 1--9.

Laine et al., "Temporal Ensembling for Semi-Supervised Learning," arXiv, Nov. 7, 2016, 9 pages.

Lang et al., "Pointpillars: Fast encoders for object detection from point clouds," Proceedings of the IEEE Conference on Computer Vision and Pattern Recognition, Jun. 2019, pp. 12697-12705.

Lee, "Pseudo-label: The Simple and efficient semi-supervised learning method for deep neural networks," Presented at ICML Workshop, Atlanta, Georgia, Jun. 16-21, 2013, 6 pages.

Li et al., "OPTIMOL: Automatic Online Picture Collection via Incremental Model Learning," International Journal of Computer Vision, Jun. 2010, 8 pages.

Li et al., "PointAugment: An Auto-Augmentation Framework for Point Cloud Classification," Proceedings of the IEEE/CVF Conference on Computer Vision and Pattern Recognition, Jun. 2020, pp. 6378-6387.

Luo et al., "Fast and Furious: Real Time End-to-End 3D Detection, Tracking and Motion Forecasting With a Single Convolutional Net," Proceedings of the IEEE Conference on Computer Vision and Pattern Recognition, Jun. 2018, pp. 3569-3577.

McLachlan, "Iterative Reclassification Procedure for Constructing an Asymptotically Optimal Rule of Allocation in Discriminant Analysis," Journal of the American Statistical Association, Jun. 1975, 70(350):365-369.

Meng et al., "Weakly Supervised 3D Object Detection from Lidar Point Cloud," arXiv, Jul. 23, 2020, 20 pages.

Ngiam et al., "StarNet: Targeted Computation for Object Detection in Point Clouds," arXiv, Dec. 2, 2019, 12 pages.

Papandreou et al., "Weakly- and Semi-Supervised Learning of a Deep Convolutional Network for Semantic Image Segmentation," Proceedings of the IEEE International Conference on Computer Vision, Dec. 2015, pp. 1742-1750.

Park et al., "Improved noisy student training for automatic speech recognition," arXiv, Oct. 29, 2020, 5 pages.

Radosavovic et al., "Data Distillation: Towards Omni-Supervised Learning," Proceedings of the IEEE Conference on Computer Vision and Pattern Recognition, Jun. 2018, pp. 4119-4128.

Recht et al., "Do ImageNet Classifiers Generalize to ImageNet?," arXiv, Feb. 13, 2019, 12 pages.

Rosenberg et al., "Semi-supervised self-training of object detection models," Presented at 7th IEEE Workshop on Applications of Computer Vision / IEEE Workshop on Motion and Video Computing (WACV/MOTION 2005), Breckenridge, CO, USA, Jan. 5-7, 2005, 8 pages.

Sajjadi et al., "Regularization With Stochastic Transformations and Perturbations for Deep Semi-Supervised Learning," Advances in Neural Information Processing Systems, Dec. 2016, 9 pages.

Scudder, "Probability of error of some adaptive pattern-recognition machines," IEEE Transactions on Information Theory, Jul. 1965, pp. 363-371.

Shrivastava et al., "Learning From Simulated and Unsupervised Images Through Adversarial Training," Proceedings of the IEEE Conference on Computer Vision and Pattern Recognition, Jul. 2017, pp. 2107-2116.

Sohn et al., "A Simple Semi-Supervised Learning Framework for Object Detection," arXiv, Dec. 3, 2020, 15 pages.

Sohn et al., "FixMatch: Simplifying Semi-Supervised Learning with Consistency and Confidence," arXiv, Nov. 25, 2020, 21 pages.

Sun et al., "Scalability in Perception for Autonomous Driving: Waymo Open Dataset," Proceedings of the IEEE/CVF Conference on Computer Vision and Pattern Recognition, Jun. 2020, pp. 2446-2454.

Szegedy et al., "Intriguing properties of neural networks," arXiv, Feb. 19, 2014, 10 pages.

Tang et al., "Transferable Semi-Supervised 3D Object Detection From RGB-D Data," Proceedings of the IEEE/CVF International Conference on Computer Vision, Oct. 2019, pp. 1931-1940.

Thrun et al., "Stanley: The robot that won the DARPA Grand Challenge," Journal of Field Robotics, Sep. 25, 2006, 23(9):661-692.

(56)         References Cited

OTHER PUBLICATIONS

Wang et al., "Train in Germany, Test in the USA: Making 3D Object Detectors Generalize," Proceedings of the IEEE/CVF Conference on Computer Vision and Pattern Recognition, Jun. 2020, pp. 11713-11723.

Xie et al., "Self-Training With Noisy Student Improves ImageNet Classification," Proceedings of the IEEE/CVF Conference on Computer Vision and Pattern Recognition, Jun. 2020, pp. 10687-10698.

Yalniz et al., "Billion-scale semi-supervised learning for image classification," arXiv, May 2, 2019, 12 pages.

Yan et al., "SECOND: Sparsely Embedded Convolutional Detection," Sensors, Oct. 6, 2018, 18(10):3337, 17 pages.

Yang et al., "HDNET: Exploiting HD Maps for 3D Object Detection," Proceedings of The 2nd Conference on Robot Learning, Oct. 2018, 10 pages.

Yang et al., "PIXOR: Real-Time 3D Object Detection From Point Clouds," Proceedings of the IEEE Conference on Computer Vision and Pattern Recognition, Jun. 2018, pp. 7652-7660.

yann.lecun.com [online], "The MNIST Datanase of handwritten digits," 2010, retrieved on Jun. 13, 2020, retrieved from URL<http://yann.lecun.com/exdb/mnist/>, 7 pages.

Zhou et al., "End-to-End Multi-View Fusion for 3D Object Detection in LiDAR Point Clouds," Proceedings of the Conference on Robot Learning, Nov. 2020, 10 pages.

Zhou et al., "VoxelNet: End-to-End Learning for Point Cloud Based 3D Object Detection," Proceedings of the IEEE Conference on Computer Vision and Pattern Recognition, Jun. 2018, pp. 4490-4499.

Zoph et al., "Rethinking pre-training and self-training," arXiv, Nov. 15, 2020, 20 pages.

* cited by examiner

200

202 — Train teacher neural network on labeled data

204 — Process unlabeled training inputs using teacher neural network

206 — Generate pseudo-labels

208 — Train student neural network on labeled data and pseudo-labeled data

300

Process training input using trained teacher neural network ⌐302

Select regions that exceed threshold value ⌐304

Generate pseudo-labeled training example ⌐306

THREE-DIMENSIONAL OBJECT DETECTION USING PSEUDO-LABELS

CROSS-REFERENCE TO RELATED APPLICATION

This application claims priority to U.S. Provisional Application No. 63/123,407, filed on Dec. 9, 2020. The disclosure of the prior application is considered part of and is incorporated by reference in the disclosure of this application.

BACKGROUND

This specification relates to processing point clouds using neural networks to detect objects that are depicted in the point clouds.

A neural network is a machine learning model that includes an output layer and one or more hidden layers that each apply a non-linear transformation to a received input to generate an output.

SUMMARY

This specification describes a system implemented as computer programs on one or more computers in one or more locations that trains a student neural network to perform three-dimensional object detection on student inputs that each include a set of one or more point clouds.

Particular embodiments of the subject matter described in this specification can be implemented so as to realize one or more of the following advantages.

To safely deploy autonomous vehicles, onboard perception systems must work reliably at high accuracy across a diverse set of environments and geographies. One of the most common techniques to improve the efficacy of such systems in new domains involves collecting large labeled datasets, but such datasets can be extremely costly to obtain, especially if each new deployment geography requires additional data with 3D bounding box annotations that are difficult to obtain, i.e., because it is time intensive for human users to manually annotate a large amount of data with 3D bounding boxes. The described techniques employ pseudo-labeling for 3D object detection to exploit less expensive and more widely available unlabeled data, and can lead to performance gains across various architectures, data augmentation strategies, and sizes of the labeled dataset. Additionally, pseudo-labels can be used to distill computationally expensive teachers into computationally efficient, simple students that can effectively perform 3D object detection within the latency requirements and computation requirements that are necessary for a perception system that is deployed on-board an autonomous vehicle. As a particular example, pseudo-label-trained student models can outperform supervised models trained on 3-10 times the amount of labeled examples. Additionally, these student models generalize better than supervised models to a new domain for which only unlabeled data is available, making pseudo-label training an effective form of unsupervised domain adaptation.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
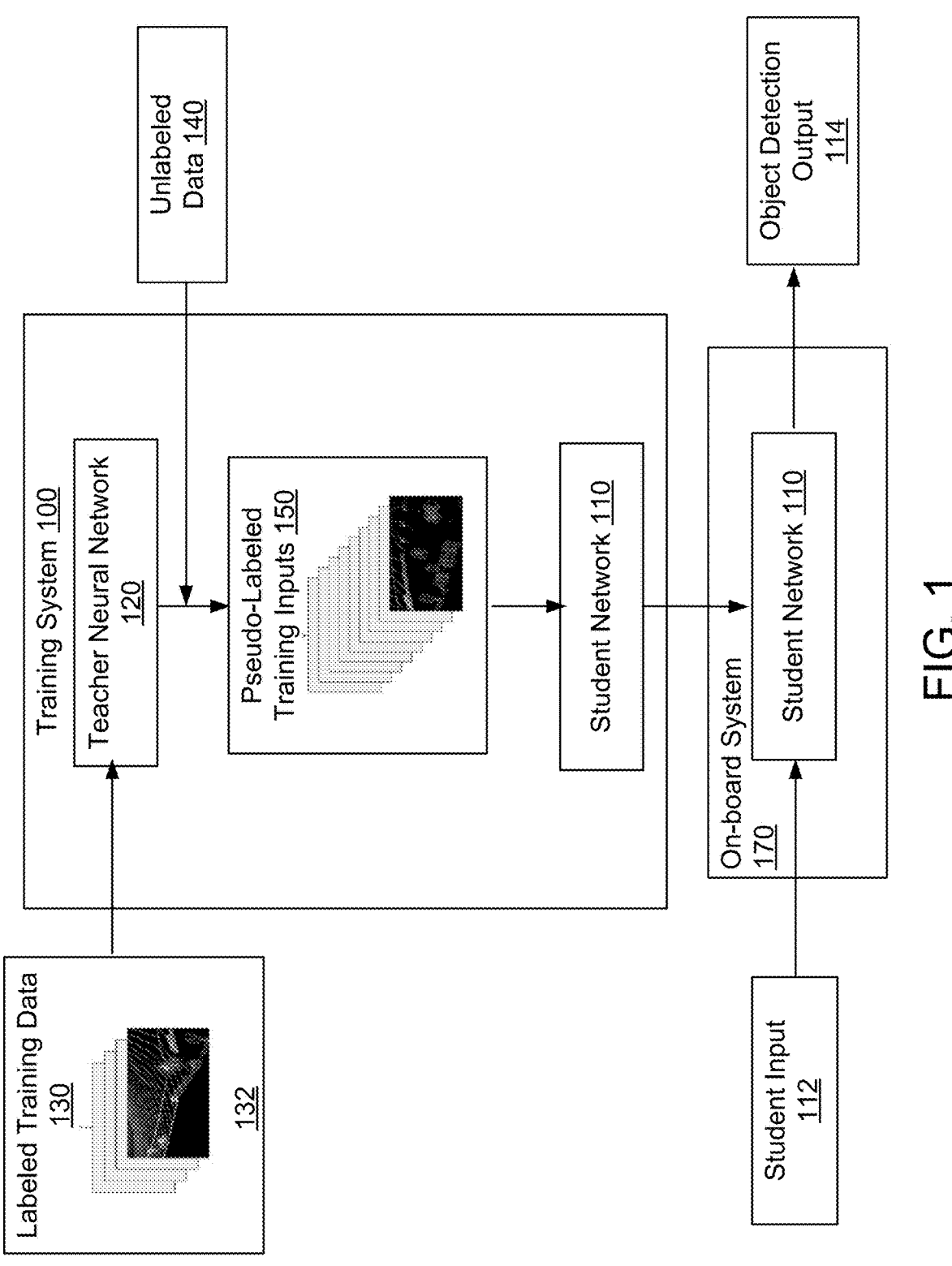
FIG. 1 shows an example training system.

FIG. 1 shows an example training system 100. The training system 100 is an example of a system implemented as computer programs on one or more computers in one or more locations, in which the systems, components, and techniques described below can be implemented.

The system 100 trains a student neural network 110 to perform three-dimensional (3D) object detection on a student input that includes a set of one or more point clouds. That is, the student neural network 110 is configured to receive a student input 112 that includes a set of one or more point clouds and to generate a 3D object detection output 114 for the student input 112.

Each point cloud in the set of one or more point clouds includes multiple points that represent a sensor measurement of a scene in an environment captured by one or more sensors. For example, the one or more sensors can be sensors, e.g., Lidar sensors or other sensors that are considered to detect reflections of laser light, of an autonomous vehicle, e.g., a land, air, or sea vehicle, and the scene can be a scene that is in the vicinity of the autonomous vehicle in the environment.

More specifically, a laser sensor or other sensor can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

When there are multiple point clouds in the set, the point clouds can be arranged in a temporal sequence. The sequence is referred to as a temporal sequence because the point clouds are arranged according to the order in which the corresponding sensor measurements were generated.

The 3D object detection output 114 specifies one or more 3D regions, e.g., one or more 3D bounding boxes, in the set of one or more point clouds that are predicted to depict an object. In particular, the 3D object detection output 114 can specify, for each of the one or more 3D regions, the coordinates of the 3D region in the coordinate system of one of the point clouds in the set, e.g., in the last point cloud in the temporal sequence. In some cases, the 3D object detection output 114 also includes other data for each specified region, e.g., a confidence score that represents the predicted likelihood that the region actually depicts an object.

After the training system 100 trains the student neural network 110, the trained student neural network can be deployed for performing 3D objection detection on new student inputs 112.

For example, once trained, the student neural network 110 may be deployed on-board an autonomous vehicle. That is, after training, the object detection may be performed by an on-board computer system 170 of an autonomous vehicle navigating through the environment and the point clouds that are processed by the trained student neural network 110 may be generated by one or more sensors of the autonomous vehicle, e.g., a Lidar sensor. A planning system of the vehicle can use the object detections, i.e., the 3 d object detection outputs 114, to make planning decisions to plan a future trajectory of the vehicle, e.g., by generating or modifying the future trajectory to avoid collisions with any of the detected objects.

To train the student neural network 110, the system 100 makes use of a teacher neural network 120 that is also configured to perform 3D object detection.

The teacher neural network 120 and the student neural network 110 can have any appropriate architecture that allows the neural network to map points from one or more point clouds to a 3D object detection output.

As one example, the teacher and student neural networks can have a convolutional neural network—based architecture, e.g., a PointPillars-based architecture. PointPillars architectures are described in more detail in Alex H Lang, Sourabh Vora, Holger Caesar, Lubing Zhou, Jiong Yang, and Oscar Beijbom. Pointpillars: Fast encoders for object detection from point clouds. In Proceedings of the IEEE Conference on Computer Vision and Pattern Recognition, pages 12697-12705, 2019.

As another example, the teacher and student neural networks can have a convolution-free architecture, e.g., a StarNet-based architecture. StarNet architectures are described in more detail in Jiquan Ngiam, Benjamin Caine, Wei Han, Brandon Yang, Yuning Chai, Pei Sun, Yin Zhou, Xi Yi, Ouais Alsharif, Patrick Nguyen, et al. Starnet: Targeted computation for object detection in point clouds. arXiv preprint arXiv: 1908.11069, 2019.

As yet another example, one of the neural networks can have a convolutional neural network—based architecture while the other neural network can have a convolution-free architecture.

Generally, in some cases, the teacher neural network 120 has the same architecture as the student neural network 110 and operates on the same set of inputs as the teacher neural network 120.

In some other cases, the teacher neural network 120 has a different architecture from the student neural network 110, operates on a different set of inputs than the student neural network 110, or both.

For example, the student neural network 110 can be more computationally efficient because the student neural network 110 receives inputs that have fewer point clouds than the inputs received by the teacher neural network 120, has fewer parameters than the teacher neural network 120, or both.

As one example, the teacher inputs that are received by the teacher neural network 120 can include a temporal sequence of multiple point clouds, while the student inputs can include only a single point cloud.

As another example, both the teacher neural network 120 and the student neural network 110 can generate intermediate features that have the same spatial dimensions, but the features generated by the teacher neural network can have a larger channel dimension, i.e., have more channels. For example, if the student neural network 110 generates an h×w×d feature, the teacher neural network 120 can generate an h×w×D feature, where D is greater than d, e.g., equal to 2 d, 4 d, or 8 d.

In some cases, the teacher neural network 120 can be too computationally intensive to be deployed on-board an autonomous vehicle. For example, while the teacher neural network 120 may be able to be trained to perform accurate object detection, the size of the teacher neural network 120 may exceed the available memory on-board the autonomous vehicle or may cause performing inference using the teacher neural network 120 to exceed the latency budget allotted on-board the autonomous vehicle.

Generally, the system 100 trains the student neural network 110 in three steps.

More specifically, in the first step, the system 100 or a different training system trains the teacher neural network 120 on labeled training data 130 that includes a plurality of labeled training examples 132.

Each labeled training example 132 includes (i) a training teacher input that includes a sequence of one or more point clouds, and (ii) a label that specifies one or more ground truth 3D regions in the one or more point clouds that each correspond to a respective object. The ground truth 3D regions are regions that have been identified by an external source, e.g., a human labeler, as regions that actually correspond to an object.

Once the teacher neural network 120 has been trained, in the second step, the system 100 generates pseudo-labeled training examples 150 from a set of unlabeled teacher inputs 140.

In particular, the system 100 processes, using the trained teacher neural network 120, a set of unlabeled teacher inputs 140 to generate a respective teacher 3D object detection output for each unlabeled teacher input. The unlabeled teacher inputs 140 are referred to as "unlabeled" because they are not associated with any labels, i.e., with any ground truth 3D regions.

The system 100 generates a plurality of pseudo-labeled training examples 150 by, for each unlabeled teacher input 140 in the set, generating, from the teacher 3D object detection output generated by the trained teacher neural network 120 for the unlabeled teacher input, a pseudo-label that identifies one or more 3D regions in the unlabeled teacher input.

Generating pseudo-labels is described in more detail below with reference to FIGS. 2 and 3.

In the third step, the system 100 then trains, on the labeled training examples 130 and the pseudo-labeled training examples 150, the student neural network 110. In particular, the system 100 can train the student neural network 110 to minimize a 3D object detection loss function that measures an error between the student output generated by the student neural network for any given input and the label or the pseudo-label for the given input.

Training the student neural network 110 is described in more detail below with reference to FIGS. 2 and 3.

As described above, after training, the system 100 or a different system deploys the student neural network 110 for performing 3 d object detection. For example, the system 100 or another system can provide the trained parameter values of the student neural network to an autonomous vehicle, e.g., over a wired or wireless network connection, so that the student neural network 110 can be used to perform 3 d object detection as part of the on-board system 170.

Thus, by making use of the teacher neural network 120, the system can effectively incorporate the unlabeled teacher inputs 140 into the training of the student neural network 110.

As a particular example, the point clouds in the unlabeled teacher inputs 140 can include point clouds from a first domain and the point clouds in the labeled training examples 132 can be point clouds from a second, different domain. That is, although the unlabeled inputs may include point clouds from both domains, the system only has access to labeled examples from the second domain. In these cases, after deployment, the student neural network 110 may be required to perform inference on point clouds from the first domain. Thus, training the student neural network 110 on only the labeled training examples 132 may prevent the student neural network 110 from performing well after training. By using the teacher neural network 120 to incorporate the unlabeled training inputs 140 into the training, however, the student neural network 110 will be able to perform accurate 3D object detection even on point clouds from the first domain even if very few or no labeled point clouds from that domain are available at the outset of training.

As one example, the point clouds in the unlabeled teacher inputs can be measurements of a first real-world region and the point clouds in the labeled training examples can be measurements of a second, different real-world region. For example, the regions can be different cities with different climates or different distributions of vehicles and other agents. Thus, point clouds from the second real-world region may not be representative of point clouds from the first real-world region.

As another example, the point clouds in the unlabeled teacher inputs can be generated under a first set of environment conditions and the point clouds in the labeled training examples can be generated under a second, different set of environment conditions. For example, the first set of environment conditions can be foggy conditions, rainy conditions, or other conditions that alter the distribution of points in a typical point cloud.

Figure 2:
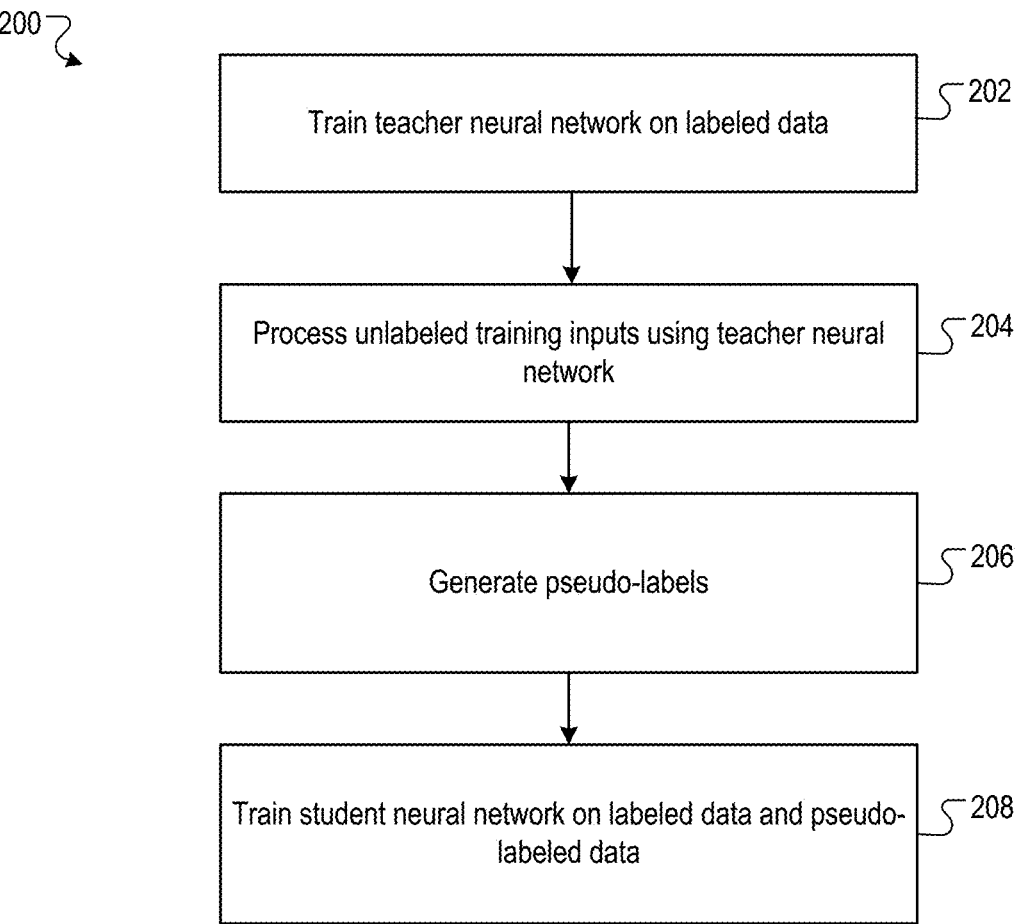
FIG. 2 is a flow diagram of an example process for training a student neural network.

FIG. 2 is a flow diagram of an example process 200 for training a student neural network. For convenience, the process 200 will be described as being performed by a system of one or more computers located in one or more locations. For example, a training system, e.g., the training system 100 of FIG. 1, appropriately programmed, can perform the process 200.

The system trains, on training data that includes a plurality of labeled training examples, a teacher three-dimensional (3D) object detection neural network that is configured to receive a teacher input that includes a sequence of one or more point clouds and to generate a teacher 3D object detection output that identifies one or more 3D regions in the one or more point clouds in the teacher input that are likely to correspond to objects (step 202).

In cases where the teacher input includes multiple point clouds, the system can project each point cloud into the coordinate system of the last point cloud in the sequence and the teacher 3 d object detection can identify regions in the coordinate system of the last point cloud.

In some implementations, the teacher 3 d object detection output also includes, for each of the regions, a confidence score that represents the predicted likelihood that the region actually depicts an object.

As described above, each labeled training example includes (i) a training teacher input that includes a sequence of one or more point clouds, and (ii) a label that specifies one or more ground truth 3D regions in the one or more point clouds that each correspond to a respective object.

The system can train the teacher neural network on the labeled training data using any appropriate supervised learning technique. For example, the system can train the teacher neural network using an appropriate optimizer, e.g., Adam, rmsProp, or Adafactor, to minimize an appropriate 3 d object detection loss function that measures errors between teacher outputs for training teacher inputs and the corresponding labels for the training teacher inputs.

In some implementations, the system employs data augmentation during the training of the teacher neural network, i.e., performs augmentations to some or all of the training teacher inputs before the training teacher inputs are processed using the teacher neural network. For example, the system can apply world rotation augmentations, scene mirroring augmentations, or both, during the training.

In some implementations, the system trains multiple candidate teacher neural networks in parallel, e.g., models having the same architecture but different parameter initializations, and then selects the best performing candidate neural network on a validation set as the teacher neural network.

After the training, the system processes, using the trained teacher 3D object detection neural network, a set of unlabeled teacher inputs to generate a respective teacher 3D object detection output for each unlabeled teacher input (step 204).

The system generates a plurality of pseudo-labeled training examples by, for each unlabeled teacher input in the set, generating, from the teacher 3D object detection output generated by the trained teacher 3D object detection neural network for the unlabeled teacher input, a pseudo-label that identifies one or more 3D regions in the unlabeled teacher input (step 206).

The system then trains, on the labeled training examples and the pseudo-labeled training examples, a student 3D object detection neural network that is configured to receive a student input that includes a sequence of one or more point clouds and to generate a student 3D object detection output that identifies one or more 3D regions in the one or more point clouds in the student input that are likely to correspond to objects (step 208).

In particular, the system generates a respective student training example from each labeled training example and each pseudo-labeled training example by generating a student input from the teacher input in the training example and associating the label or pseudo-label in the training example with the student input, i.e., as the ground truth output for the student input.

When the teacher inputs and the student inputs have the same number of point clouds, the student input can be the same as the teacher input. However, as described above, in some cases, the teacher inputs to the teacher neural network include more point clouds, i.e., a longer temporal sequence of point clouds, than do the student inputs. In these cases, as part of the training, the system, generates, for each teacher input in the labeled training examples and the pseudo-labeled training examples, a corresponding student input by removing one or more of the point clouds from the sequence of point clouds in the teacher input. For example, when the student inputs include a single point cloud and the teacher inputs include a sequence of multiple point clouds, the system can generate a student input from a teacher input by removing all but the last point cloud from the sequence in the teacher input.

The system can then train the student neural network on the student training examples using any appropriate supervised learning technique. For example, the system can train the teacher neural network using an appropriate optimizer, e.g., Adam, rmsProp, or Adafactor, to minimize an appropriate 3 d object detection loss function that measures errors between student outputs for training student inputs and the corresponding labels or pseudo-labels for the training student inputs, e.g., the same loss function used to train the teacher neural network.

In some implementations, the system employs data augmentation during the training of the student neural network, i.e., performs augmentations to some or all of the training teacher inputs before the training teacher inputs are processed using the teacher neural network. For example, the system can apply world rotation augmentations, scene mirroring augmentations, or both, during the training.

Figure 3:
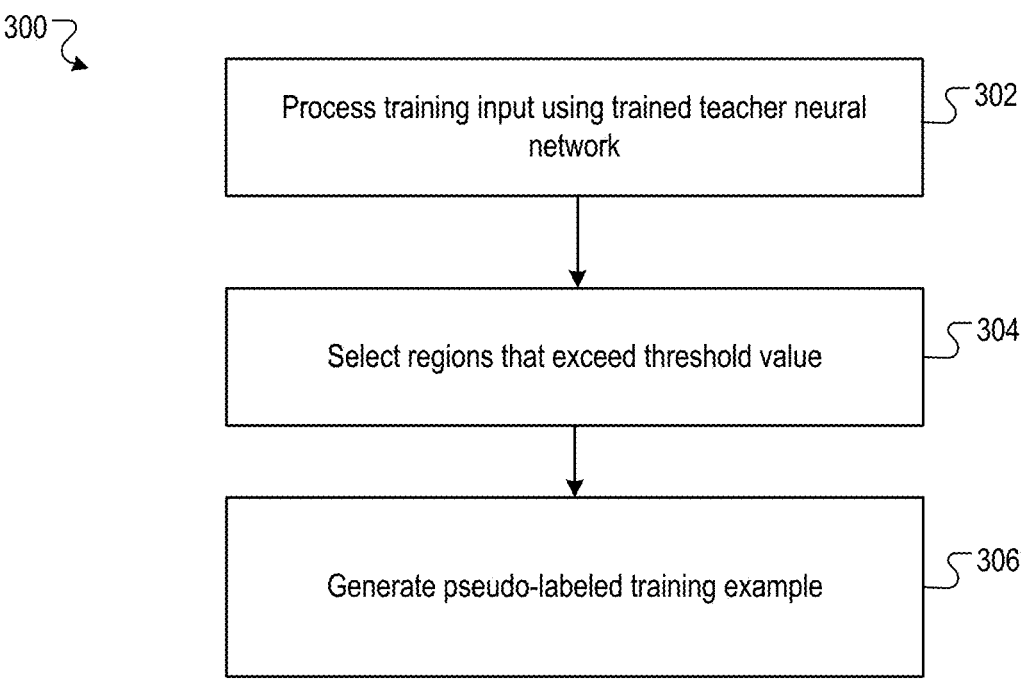
FIG. 3 is a flow diagram of an example process for generating a pseudo-label.

FIG. 3 is a flow diagram of an example process 300 for generating a pseudo-label for an unlabeled teacher input. For convenience, the process 300 will be described as being performed by a system of one or more computers located in one or more locations. For example, a training system, e.g., the training system 100 of FIG. 1, appropriately programmed, can perform the process 300.

The system processes the unlabeled teacher input using the trained teacher neural network to generate a teacher output (step 302). The teacher output identifies one or more 3D regions that are predicted to depict, i.e., correspond to or include points that measure, an object. The teacher output also includes a confidence score for each 3D region that represents the predicted likelihood that the 3D region actually depicts an object.

The system selects, for inclusion in the pseudo-label, only 3D regions for which the confidence score in the teacher output exceeds a threshold score (step 304).

The system generates a pseudo-label that identifies, as the ground truth regions in the point cloud(s) in the teacher input that actually depicts objects, only the 3D regions specified in the teacher output for which the teacher output exceeds the threshold score (step 306).

This specification uses the term "configured" in connection with systems and computer program components. For a system of one or more computers to be configured to perform particular operations or actions means that the system has installed software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:

training, on training data comprising a plurality of labeled training examples, a teacher three-dimensional (3D) object detection neural network that is configured to receive a teacher input comprising a sequence of one or more point clouds and to generate a teacher 3D object detection output that identifies one or more 3D regions in the one or more point clouds in the teacher input that are likely to correspond to objects, wherein each labeled training example comprises:

(i) a training teacher input that includes a temporal sequence of a plurality of point clouds, and (ii) a label that specifies one or more ground truth 3D regions in the plurality of point clouds that each correspond to a respective object;

processing, using the trained teacher 3D object detection neural network, a set of unlabeled teacher inputs to generate a respective teacher 3D object detection output for each unlabeled teacher input;

generating a plurality of pseudo-labeled training examples by, for each unlabeled teacher input in the set, generating, from the teacher 3D object detection output generated by the trained teacher 3D object detection neural network for the unlabeled teacher input, a pseudo-label that identifies one or more 3D regions in the unlabeled teacher input; and training, on the labeled training examples and the pseudo-labeled training examples, a student 3D object detection neural network that is configured to receive a student input comprising a single point cloud and to generate a student 3D object detection output that identifies one or more 3D regions in the single point cloud in the student input that are likely to correspond to objects, the training comprising:

generating a respective student training example for each pseudo-labeled training example and each labeled training example, comprising, for each pseudo-labeled training example:

generating a respective student input from the respective training teacher input in the pseudo-labeled training example by removing all point clouds preceding a last point cloud in the temporal sequence of point clouds in the respective training teacher input in the pseudo-labeled training example; and associating the pseudo-label in the pseudo-labeled training example with the respective student input; and training the student 3D object detection neural network on the respective student training examples.

2. The method of claim 1, wherein the teacher 3D object detection neural network and the student 3D object detection neural network have a same neural network architecture.

3. The method of claim 1, wherein the teacher 3D object detection neural network has a larger number of parameters than the student 3D object detection neural network.

4. The method of claim 3, wherein the teacher 3D object detection neural network operates on features that have a larger number of channels than the student 3D object detection neural network.

5. The method of claim 1, wherein the teacher 3D object detection output also includes a respective confidence score for each of the one or more 3D regions identified in the teacher 3D object detection output that represents a predicted likelihood that the 3D region corresponds to an object.

6. The method of claim 5, wherein generating a pseudo-label that identifies one or more 3D regions in the unlabeled teacher input comprises: selecting, for inclusion in the pseudo-label, only 3D regions for which the confidence score in the teacher 3D object detection output exceeds a threshold score.

7. The method of claim 1, wherein the point clouds in the unlabeled teacher inputs are from a first domain and the point clouds in the labeled training examples are from a second, different domain.

8. The method of claim 7, wherein the point clouds in the unlabeled teacher inputs are measurements of a first real-world region and the point clouds in the labeled training examples are measurements of a second, different real-world region.

9. The method of claim 7, wherein the point clouds in the unlabeled teacher inputs are generated under a first set of environment conditions and the point clouds in the labeled training examples are generated under a second, different set of environment conditions.

10. The method of claim 1, wherein training the student neural network comprises applying data augmentation to the labeled training examples, the pseudo-labeled training examples, or both.

11. The method of claim 1, wherein training the teacher neural network comprises applying data augmentation to the labeled training examples.

12. The method of claim 1, further comprising:

providing the trained student 3D object detection neural network for deployment onboard an autonomous vehicle.

13. One or more non-transitory computer-readable storage media storing instructions that when executed by one or more computers cause the one or more computers to perform operations comprising:

training, on training data comprising a plurality of labeled training examples, a teacher three-dimensional (3D) object detection neural network that is configured to receive a teacher input comprising a sequence of one or more point clouds and to generate a teacher 3D object detection output that identifies one or more 3D regions in the one or more point clouds in the teacher input that are likely to correspond to objects, wherein each labeled training example comprises:

(i) a training teacher input that includes a temporal sequence of a plurality of point clouds, and (ii) a label that specifies one or more ground truth 3D regions in the plurality of point clouds that each correspond to a respective object;

processing, using the trained teacher 3D object detection neural network, a set of unlabeled teacher inputs to generate a respective teacher 3D object detection output for each unlabeled teacher input;

generating a plurality of pseudo-labeled training examples by, for each unlabeled teacher input in the set, generating, from the teacher 3D object detection output generated by the trained teacher 3D object detection neural network for the unlabeled teacher input, a pseudo-label that identifies one or more 3D regions in the unlabeled teacher input; and training, on the labeled training examples and the pseudo-labeled training examples, a student 3D object detection neural network that is configured to receive a student input comprising a single point cloud and to generate a student 3D object detection output that identifies one or more 3D regions in the single point cloud in the student input that are likely to correspond to objects, the training comprising:

generating a respective student training example for each pseudo-labeled training example and each labeled training example, comprising, for each pseudo-labeled training example:

generating a respective student input from the respective training teacher input in the pseudo-labeled training example by removing all point clouds preceding a last point cloud in the temporal sequence of point clouds in the respective training teacher input in the pseudo-labeled training example; and associating the pseudo-label in the pseudo-labeled training example with the respective student input; and training the student 3D object detection neural network on the respective student training examples.

14. A system comprising:

one or more computers; and one or more storage devices storing instructions that, when executed by the one or more computers, cause the one or more computers to perform operations comprising:

training, on training data comprising a plurality of labeled training examples, a teacher three-dimensional (3D)

object detection neural network that is configured to receive a teacher input comprising a sequence of one or more point clouds and to generate a teacher 3D object detection output that identifies one or more 3D regions in the one or more point clouds in the teacher input that are likely to correspond to objects, wherein each labeled training example comprises:

(i) a training teacher input that includes a temporal sequence of a plurality of point clouds, and (ii) a label that specifies one or more ground truth 3D regions in the plurality of point clouds that each correspond to a respective object;

processing, using the trained teacher 3D object detection neural network, a set of unlabeled teacher inputs to generate a respective teacher 3D object detection output for each unlabeled teacher input;

generating a plurality of pseudo-labeled training examples by, for each unlabeled teacher input in the set, generating, from the teacher 3D object detection output generated by the trained teacher 3D object detection neural network for the unlabeled teacher input, a pseudo-label that identifies one or more 3D regions in the unlabeled teacher input; and training, on the labeled training examples and the pseudo-labeled training examples, a student 3D object detection neural network that is configured to receive a student input comprising a single point cloud and to generate a student 3D object detection output that identifies one or more 3D regions in the single point cloud in the student input that are likely to correspond to objects, the training comprising:

generating a respective student training example for each pseudo-labeled training example and each labeled training example, comprising, for each pseudo-labeled training example:

generating a respective student input from the respective training teacher input in the pseudo-labeled training example by removing all point clouds preceding a last point cloud in the temporal sequence of point clouds in the respective training teacher input in the pseudo-labeled training example; and associating the pseudo-label in the pseudo-labeled training example with the respective student input; and training the student 3D object detection neural network on the respective student training examples.

15. The system of claim 14, wherein the teacher 3D object detection neural network and the student 3D object detection neural network have a same neural network architecture.

16. The system of claim 14, wherein the teacher 3D object detection neural network has a larger number of parameters than the student 3D object detection neural network.

17. The system of claim 16, wherein the teacher 3D object detection neural network operates on features that have a larger number of channels than the student 3D object detection neural network.

18. The system of claim 14, wherein the teacher 3D object detection output also includes a respective confidence score for each of the one or more 3D regions identified in the teacher 3D object detection output that represents a predicted likelihood that the 3D region corresponds to an object.

19. The system of claim 18, wherein generating a pseudo-label that identifies one or more 3D regions in the unlabeled teacher input comprises: selecting, for inclusion in the pseudo-label, only 3D regions for which the confidence score in the teacher 3D object detection output exceeds a threshold score.

20. The system of claim 14, wherein the point clouds in the unlabeled teacher inputs are from a first domain and the point clouds in the labeled training examples are from a second, different domain.

* * * * *